(12) United States Patent
Yoshimura

(10) Patent No.: US 11,383,803 B2
(45) Date of Patent: Jul. 12, 2022

(54) NOISE REDUCTION SYSTEM FOR OUTBOARD MOTORS AND NOISE REDUCTION SYSTEM FOR MARINE PROPULSION DEVICES

(71) Applicant: YAMAHA HATSUDOKI KABUSHIKI KAISHA, Iwata (JP)

(72) Inventor: Kazuhiro Yoshimura, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 2 days.

(21) Appl. No.: 17/095,953

(22) Filed: Nov. 12, 2020

(65) Prior Publication Data

US 2021/0155326 A1    May 27, 2021

(30) Foreign Application Priority Data

Nov. 22, 2019   (JP) .............................. JP2019-211822

(51) Int. Cl.
| | |
|---|---|
| *B63B 79/40* | (2020.01) |
| *B63H 20/02* | (2006.01) |
| *B63H 21/14* | (2006.01) |
| *B63H 21/17* | (2006.01) |
| *F02B 61/04* | (2006.01) |
| *F02P 5/152* | (2006.01) |
| *B63H 20/00* | (2006.01) |

(52) U.S. Cl.
CPC ............. *B63B 79/40* (2020.01); *B63H 20/02* (2013.01); *B63H 21/14* (2013.01); *B63H 21/17* (2013.01); *F02B 61/045* (2013.01); *F02P 5/152* (2013.01); *B63H 2020/003* (2013.01)

(58) Field of Classification Search
CPC ........ B63B 79/40; B63H 20/02; B63H 21/14; B63H 21/17; B63H 2020/003; F02B 61/045; F02P 5/152
See application file for complete search history.

(56) References Cited

U.S. PATENT DOCUMENTS

| 10,543,895 B1* | 1/2020 | McGinley ............... B63H 25/04 |
| 2015/0311835 A1* | 10/2015 | Hara ....................... H02P 21/06 |
| | | 318/400.02 |
| 2020/0108913 A1* | 4/2020 | Schiller ................... B64C 11/50 |
| 2021/0062726 A1* | 3/2021 | Kathirchelvan ....... G01H 17/00 |

FOREIGN PATENT DOCUMENTS

| JP | 2006-137336 A | 6/2006 |
| JP | 2018-079744 A | 5/2018 |
| JP | 2019-098900 A | 6/2019 |
| JP | 2019-107995 A | 7/2019 |

* cited by examiner

*Primary Examiner* — Stephen P Avila
(74) *Attorney, Agent, or Firm* — Rabin & Berdo, P.C.

(57) ABSTRACT

A noise reduction system for a marine vessel having a plurality of marine propulsion devices including a first marine propulsion device and a second marine propulsion device, each of the plurality of marine propulsion devices including a drive source, each of the drive sources operating on a same principle as that of the other drive sources, and including a rotary member. The noise reduction system includes a controller configured to control rotation of the rotary member of the drive source in the second marine propulsion device, to thereby control a phase of a second noise caused thereby, such that a first noise caused by rotation of the rotary member of the drive source in the first marine propulsion device is canceled by the second noise.

16 Claims, 13 Drawing Sheets

NOISE REDUCTION SYSTEM FOR OUTBOARD MOTORS AND NOISE REDUCTION SYSTEM FOR MARINE PROPULSION DEVICES

CROSS REFERENCE TO RELATED APPLICATIONS

This application claims the benefit of priority to Japanese Patent Application No. 2019-211822, filed on Nov. 22, 2019. The entire contents of this application are hereby incorporated by reference.

BACKGROUND OF THE INVENTION

1. Field of the Invention

The present invention relates to a noise reduction system for outboard motors and a noise reduction system for marine propulsion devices.

2. Description of the Related Art

As a method for reducing noise generated by a noise source such as an engine, there is known, for example, a method of producing, from a speaker disposed in the vicinity of the noise source, a sound wave having a phase opposite to that of the noise generated by the noise source so as to cause an interference between the noise and the sound wave having a phase opposite to the noise to eliminate the noise. This method is required to produce a sound wave having an energy level equivalent to the noise generated by the noise source. Accordingly, this method would require installation of an amplifier and a speaker which are capable of large output. This would complicate a system configuration and require a predetermined space for constructing the system, and thus, this method is difficult to be applied to outboard motors mounted on a hull.

Meanwhile, examples of a vibration reduction method used in a marine vessel include: a method for a marine vessel equipped with two propellers, in which one propeller is driven by a main engine while the other propeller is driven by an electric motor, and the electric motor is controlled to have a set phase difference between both propellers thereby mutually canceling an exciting force generated from individual propellers (refer to Japanese Laid-open Patent Publication (kokai) No. 2006-137336, for example); and a method of shifting a rotation phase of a first propeller by a predetermined deviation angle α with respect to a rotation phase of a second propeller (refer to Japanese Laid-open Patent Publication (kokai) No. 2019-98900, for example).

The technology disclosed in Japanese Laid-open Patent Publication (kokai) No. 2006-137336 and the technology disclosed in Japanese Laid-open Patent Publication (kokai) No. 2019-98900 are designed to be applied to a large marine vessel to reduce hull vibration due to propeller-induced exciting force, making it difficult to apply these technologies to reduction of outboard motor noise, which is mainly caused by noise from the drive source.

SUMMARY OF THE INVENTION

The present invention provides a noise reduction system for outboard motors and a noise reduction system for marine propulsion devices, capable of reducing noise conveniently.

According to a preferred embodiment of the present invention, a noise reduction system for a marine vessel having a plurality of outboard motors, which include a first outboard motor and a second outboard motor, is mounted on a hull thereof, each of the plurality of outboard motors includes a drive source, each of the drive sources includes a rotary member. The noise reduction system for the outboard motors comprises a controller that controls rotation of the rotary member of the drive source in the second outboard motor, to thereby controls a phase of a second noise caused thereby, such that a first noise caused by rotation of the rotary member of the drive source in the first outboard motor is canceled by the second noise.

According to this configuration, the phase of the second noise caused by the rotation of the rotary member of at least one drive source is changed, and the second noise cancels the first noise caused by the rotation of the rotary member of the other drive source, making it possible to reduce overall noise of the plurality of outboard motors. That is, it is possible to conveniently reduce the overall noise of the plurality of outboard motors without adding a device such as a speaker.

Further features of the present invention will become apparent from the following description of preferred embodiments with reference to the attached drawings.

The above and other elements, features, steps, characteristics and advantages of the present invention will become more apparent from the following detailed description of the preferred embodiments with reference to the attached drawings.

DESCRIPTION OF THE EMBODIMENTS

Hereinafter, preferred embodiments of the present invention will be described with reference to the drawings.

Figure 1:
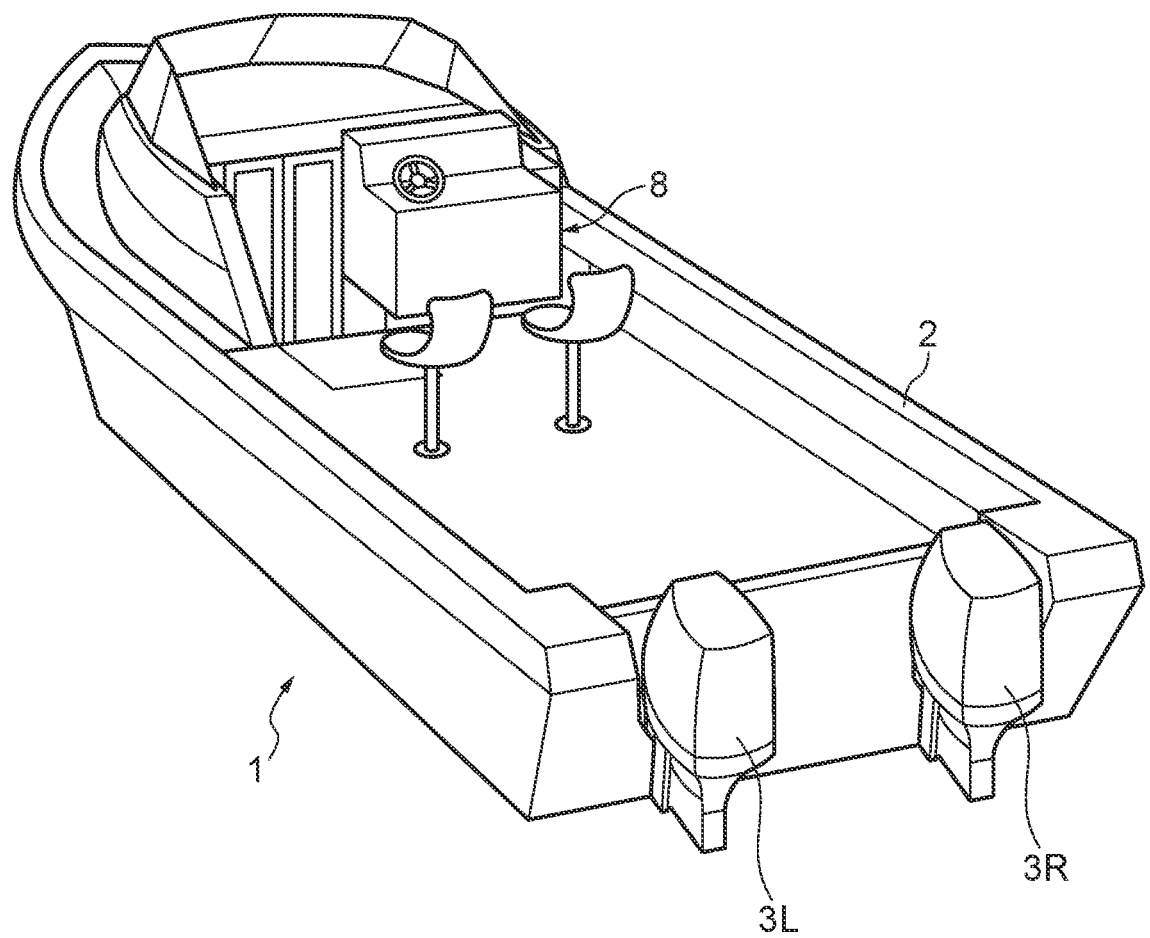
FIG. 1 is a perspective view of a marine vessel to which a noise reduction system for outboard motors according to a first embodiment is applied.
Figure 2:
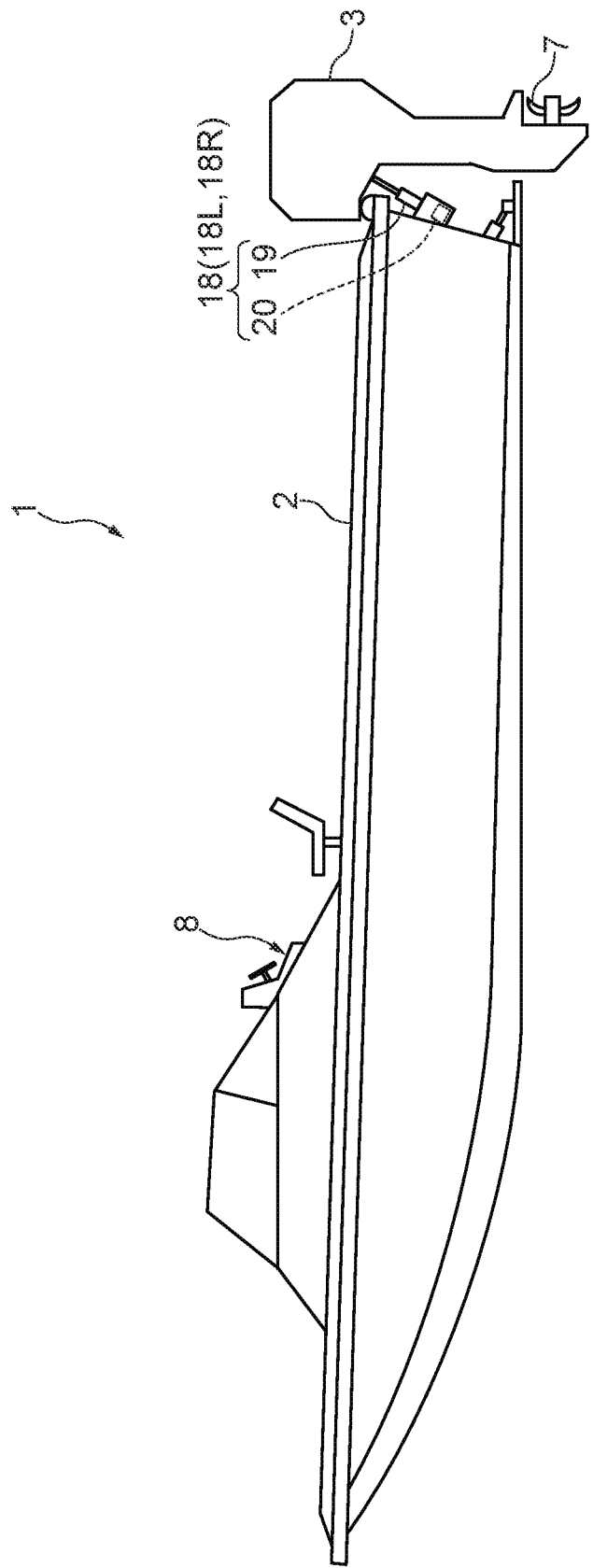
FIG. 2 is a side view of the marine vessel to which the noise reduction system for the outboard motor according to the first embodiment is applied.

FIG. 1 is a perspective view of a marine vessel 1 to which a noise reduction system for outboard motors according to the first embodiment is applied, and FIG. 2 is a side view of the marine vessel 1. The marine vessel 1 includes a hull 2 and a plurality of, for example, two outboard motors 3 as marine propulsion devices mounted on the hull 2. The noise reduction system for the outboard motors of the present invention includes the two outboard motors 3 and an outboard motor ECU (electronic control unit) 5 (described below) provided in each of the outboard motors 3. The two outboard motors 3 are mounted side by side at a stern of the hull 2. When distinguishing the two outboard motors 3 from each other, the one located on a port side is referred to as an "outboard motor 3L", and the one located on a starboard side is referred to as an "outboard motor 3R".

Although details will be described below with reference to FIG. 4, the outboard motors 3L and 3R have engines 4 (4L and 4R) (drive sources) which are internal combustion engines, and outboard motor ECUs 5 (5L and 5R) (controller), respectively. Furthermore, the noise reduction system for the outboard motors of the present invention include remote control ECUs 6 (6L and 6R) corresponding to the outboard motors 3L and 3R, respectively. Each of the outboard motors 3L and 3R obtains propulsion by a propeller 7 rotated by a driving force of the corresponding engine 4. Hereinafter, reference symbols L and R are added to components provided corresponding to the outboard motors 3L and 3R, respectively. When the respective components are not distinguished for each of the outboard motors 3L and 3R, the addition of the symbols L and R is omitted.

Figure 12:
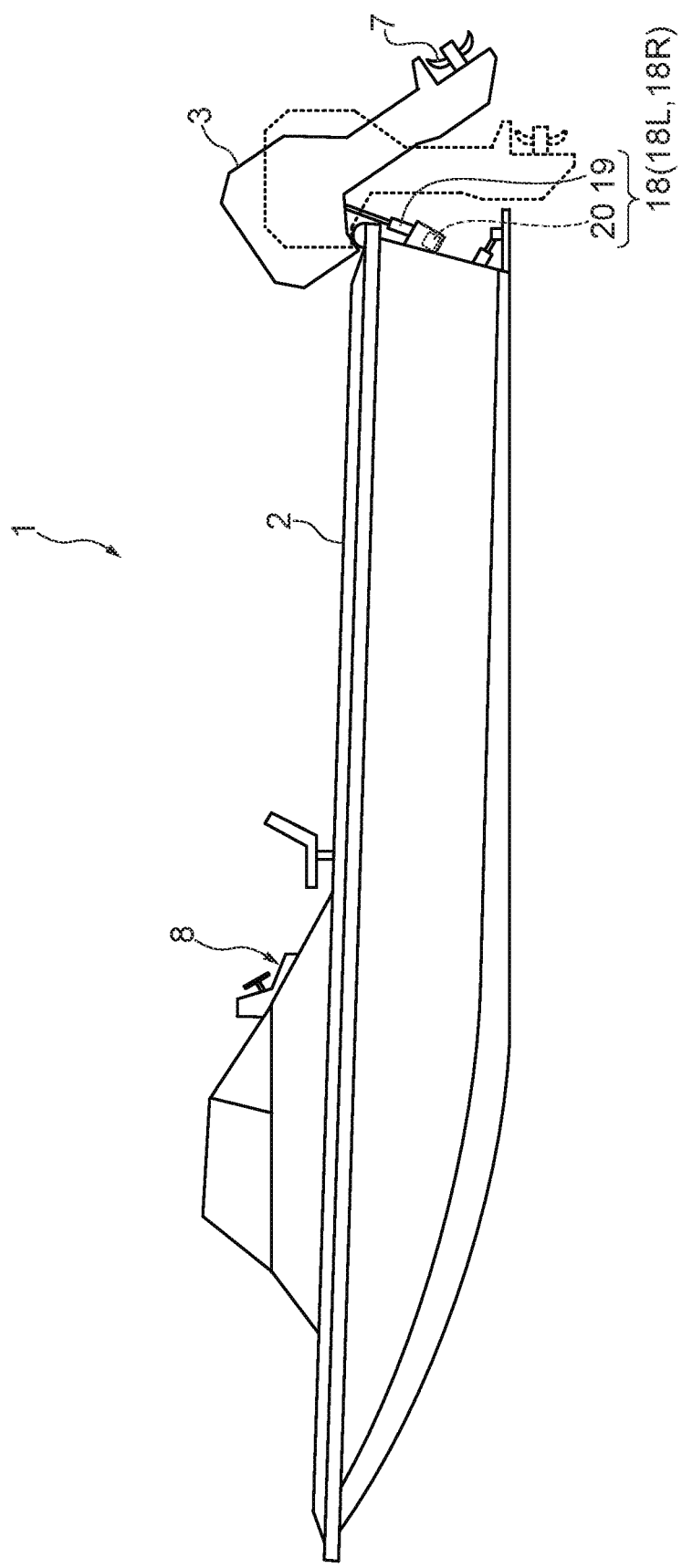
FIG. 12 is a view illustrating a tilt-up state of an outboard motor.

Furthermore, the outboard motor 3 has a PTT (Power Tilt and Trim) mechanism 18 (18L/18R) for attaching the outboard motor 3 to the stern side which is a rear part of the hull 2. The PTT mechanism 18 is a pivoting mechanism that allows the outboard motor 3 to pivot about a tilt axis (not illustrated) to move and tilt the outboard motor 3 relative to the hull 2. The PTT mechanism 18 includes a hydraulic cylinder 19 and a tilt motor 20 that drives a hydraulic pump (not illustrated) that supplies hydraulic oil to the hydraulic cylinder 19. The PTT mechanism 18 expands and contracts the hydraulic cylinder 19 with respect to the hull 2 to allow pivot movement of the outboard motor 3 about the tilt axis that shifts between, for example, a substantially vertical posture in FIG. 2 and a greatly inclined posture with a front surface of the outboard motor 3 facing downward as illustrated in FIG. 12 described below (that is, a posture having the propeller 7 below the outboard motor 3 moved diagonally in an upper right direction in the figure, and this position is referred to as a "tilt-up state"). The PTT mechanism 18 may be provided as a component separate from the outboard motor 3.

Figure 3:
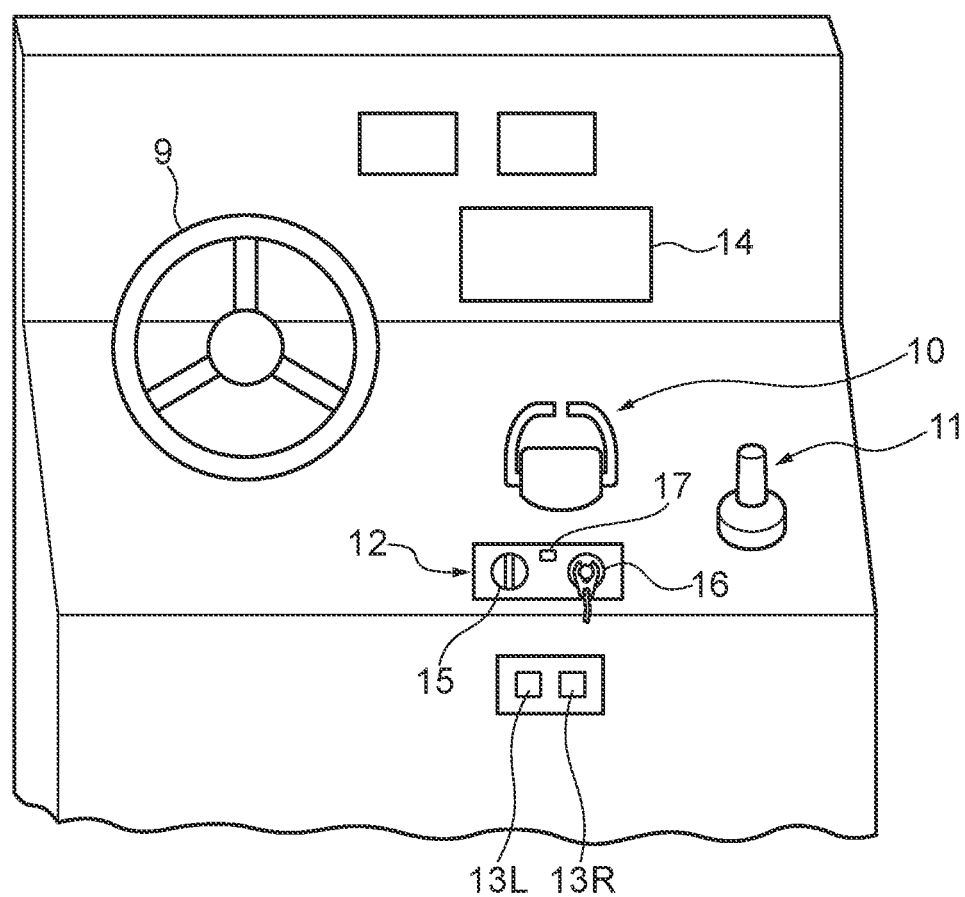
FIG. 3 is a perspective view of a main part of an operator's seat of the marine vessel in FIG. 1.

Furthermore, in the marine vessel 1, an operator's seat 8 is provided on a bow side, which is a front part of the hull 2. FIG. 3 is a perspective view of a main part of the operator's seat 8. The operator's seat 8 is equipped with a steering device 9, a remote control switch 10, a joystick switch 11, a main operation unit 12, tilt switches 13 (13L and 13R), and a display panel 14.

The steering device 9 is a device for a vessel operator, being a user or an operator, to set a course of the marine vessel 1. The vessel operator can turn the marine vessel 1 left and right by rotating the steering device 9 left and right. The vessel operator operates the remote control switch 10 to switch directions of the propulsion generated by the corresponding outboard motor 3 between the forward and backward directions while adjusting the output of the corresponding outboard motor 3, thereby enabling adjustment of the vessel speed. The joystick switch 11 can be tilted forward, backward, leftward, and rightward, and can be pivoted about its axis. The vessel operator operates the joystick switch 11 so as to be able to operate the marine vessel 1 by using a course corresponding to a tilting direction of the joystick switch 11 and the propulsion corresponding to a tilting amount of the joystick switch 11. In a normal mode, the outboard motor 3 works mainly by operations on the steering device 9 and the remote control switch 10. In a joystick mode, the outboard motor 3 works mainly by operation on the joystick switch 11. The normal mode and the joystick mode can be switched by a changeover switch (not illustrated).

The display panel 14 as a display unit displays various types of information. An example of the display panel 14 is a color LCD display having a touch panel function. The display panel 14 displays a notice indicating that the engine 4 has started for each of the outboard motors 3 in association with the remote control ECU 6.

The main operation unit 12 includes an emergency switch 16 and a start lamp 17 in addition to a main switch 15. One main switch 15 is provided to be shared by the two remote control ECUs 6. The main switch 15 is an operator for collectively starting and collectively stopping all the remote control ECUs 6 and all the outboard motor ECUs 5, that is, for collectively supplying and cutting off electric power. The main switch 15 is also an operator for collectively starting and collectively stopping the engines 4 of the outboard motors 3 to which electric power is supplied.

The tilt switch 13 (13L/13R) is operated when the vessel operator tilts up the corresponding outboard motor 3 (3L/3R). Specifically, while the tilt switch 13 is pressed down, the PTT mechanism 18 is activated to allow the outboard motor 3 to pivot with respect to the hull 2. For example, whether to allow the outboard motor 3 to pivot diagonally in the upper right direction in FIG. 2 or diagonally in the lower left direction in FIG. 2 is switched by operating a switch (not illustrated).

Figure 4:
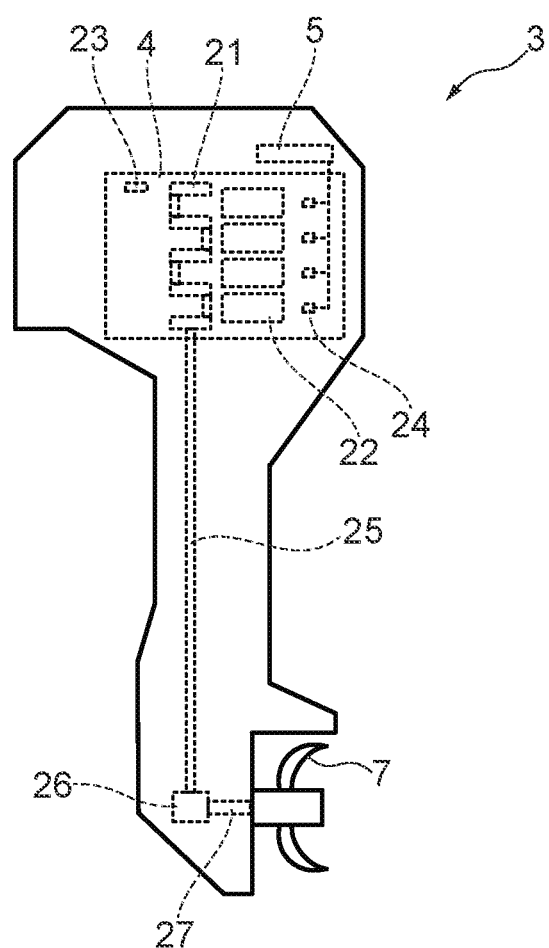
FIG. 4 is a schematic perspective side view of a configuration of the outboard motor in the first embodiment.

FIG. 4 is a schematic perspective side view of a configuration of the outboard motor 3 in the first embodiment. The outboard motor 3 includes a propeller 7 that is provided at a lower portion and exerts propulsion, an engine 4 that rotationally drives the propeller 7, and an outboard motor ECU 5 that mainly controls the engine 4.

The engine 4 is an internal combustion engine that burns fuel such as gasoline to generate power, for example, and includes a crankshaft 21 (rotary member), a plurality of, for example, four cylinders 22, and a rotation speed detector 23. The engine 4 is arranged so that the crankshaft 21 extends vertically in the figure. The crankshaft 21 is rotationally driven about a vertical axis in the figure by combustion in each of the cylinders 22. The rotation speed detector 23 detects a rotation speed of the crankshaft 21 (rotation speed of the engine 4) and outputs a detection signal in synchronization with the rotation of the crankshaft 21. The outboard motor ECU 5 calculates an engine rotation speed based on the detection signal.

The engine 4 includes a plurality of spark plugs 24 individually attached to the plurality of cylinders 22. The engine 4 also includes a plurality of intake pipes (not illustrated) individually connected to the plurality of cylinders 22, and a fuel injector 31 as well as a throttle valve (not illustrated) provided in each of the intake pipes. The outboard motor ECU 5 uses each of the spark plugs 24 to ignite and burn an air/fuel mixture supplied into each of the cylinders 22. The ignition timing is retarded in accordance with a knocking signal generated at detection of abnormal combustion (knocking, or the like).

The engine 4 and the propeller 7 are connected by a drive shaft 25, a gear box 26 and a propeller shaft 27 so as to transmit the rotation of the crankshaft 21 to the propeller 7.

Figure 5:
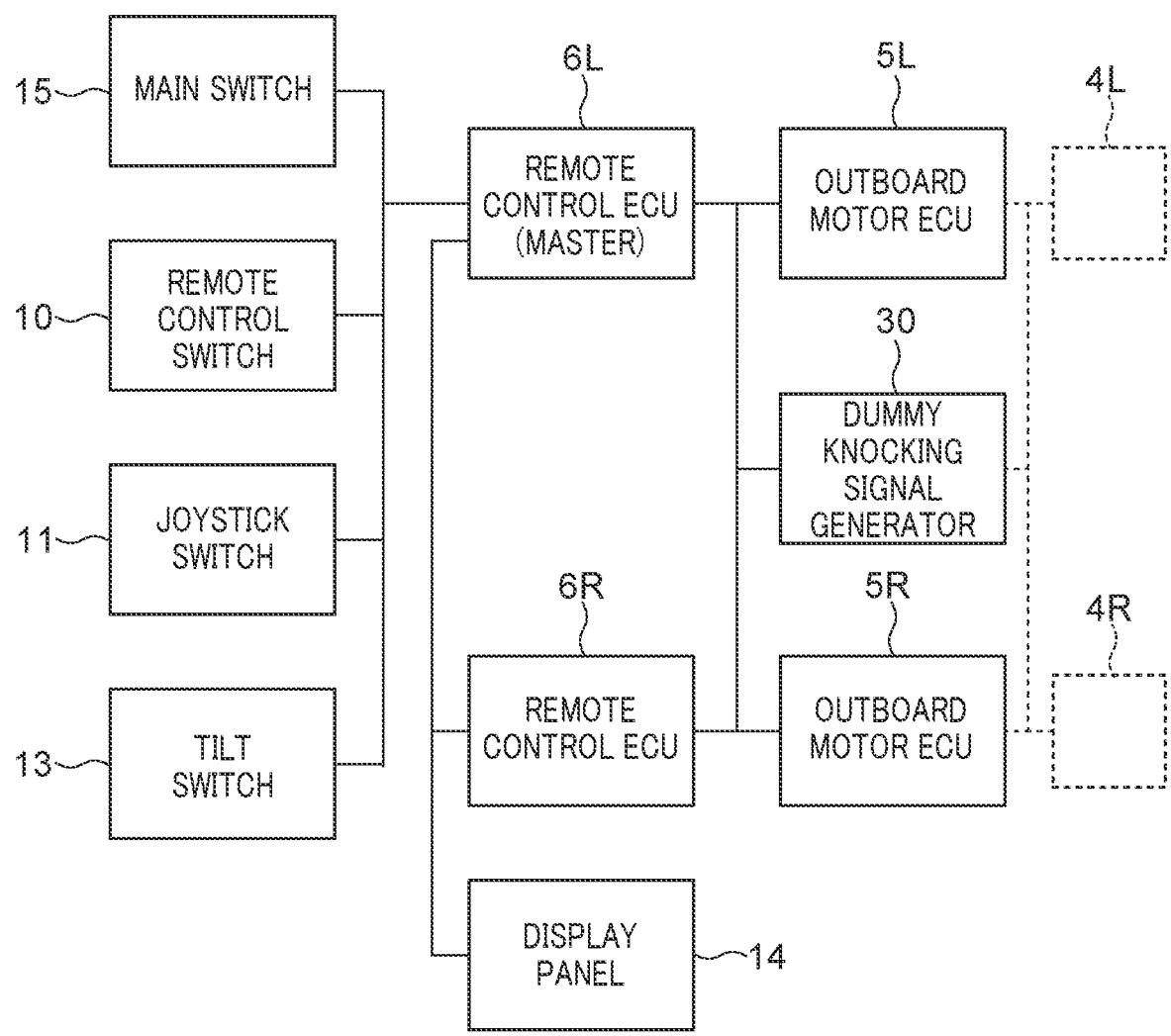
FIG. 5 is a diagram illustrating an electrical configuration of the marine vessel in FIG. 1.

FIG. 5 is a diagram illustrating an electrical configuration of the marine vessel 1. The remote control ECUs 6L and 6R mutually exchange various types of necessary information including command signals and detection signals with the corresponding outboard motor ECUs 5L and 5R, respectively. Furthermore, the remote control ECUs 6L and 6R exchange information with each other. Moreover, the remote control ECUs 6L and 6R are connected to the display panel 14.

Of the two remote control ECUs 6, the remote control ECU 6L is a representative master remote control ECU that is the main controller, while the remote control ECU 6R is a slave remote control ECU. Note that either of the two remote control ECUs 6 may be the master. A signal output by operating the remote control switch 10, the joystick switch 11, the tilt switch 13, and the main switch 15 is supplied to the remote control ECU 6L, which is the master remote control ECU. The remote control ECU 6L integrally controls each of parts including the outboard motor ECU 5L based on the supplied signal. The signal output from the steering device 9 is supplied to a steering ECU (not illustrated), and the steering ECU controls steering based on the operation of the steering device 9. In addition to the two remote control ECUs 6, it is allowable to provide a central controller that communicates with the outboard motor 3, the steering device 9, the remote control ECU 6, and the remote control switch 10 to integrally control these devices.

An operation position of the remote control switch 10 is detected by a potentiometer or the like. Information of the detected operation position is supplied from the remote control switch 10 to the remote control ECU 6 as an output signal. The remote control ECU 6 sets a target engine rotation speed and a target motor rotation speed based on the information of the operation position and transmits associated information to the corresponding outboard motor ECU 5.

Furthermore, when the tilt switch 13 is pressed down, an output signal is supplied from the tilt switch 13 to the remote control ECU 6. The remote control ECU 6 transmits an operation signal of the tilt motor 20 to the corresponding outboard motor ECU 5 based on the output signal.

Furthermore, the outboard motor ECUs 5L and 5R, the remote control ECUs 6L and 6R, and the engines 4L and 4R are connected to a dummy knocking signal generator 30. The dummy knocking signal generator 30 calculates timing based on a crank angle of the engine 4 or the like and transmits a dummy knocking signal to the outboard motor ECU 5.

Figure 6:
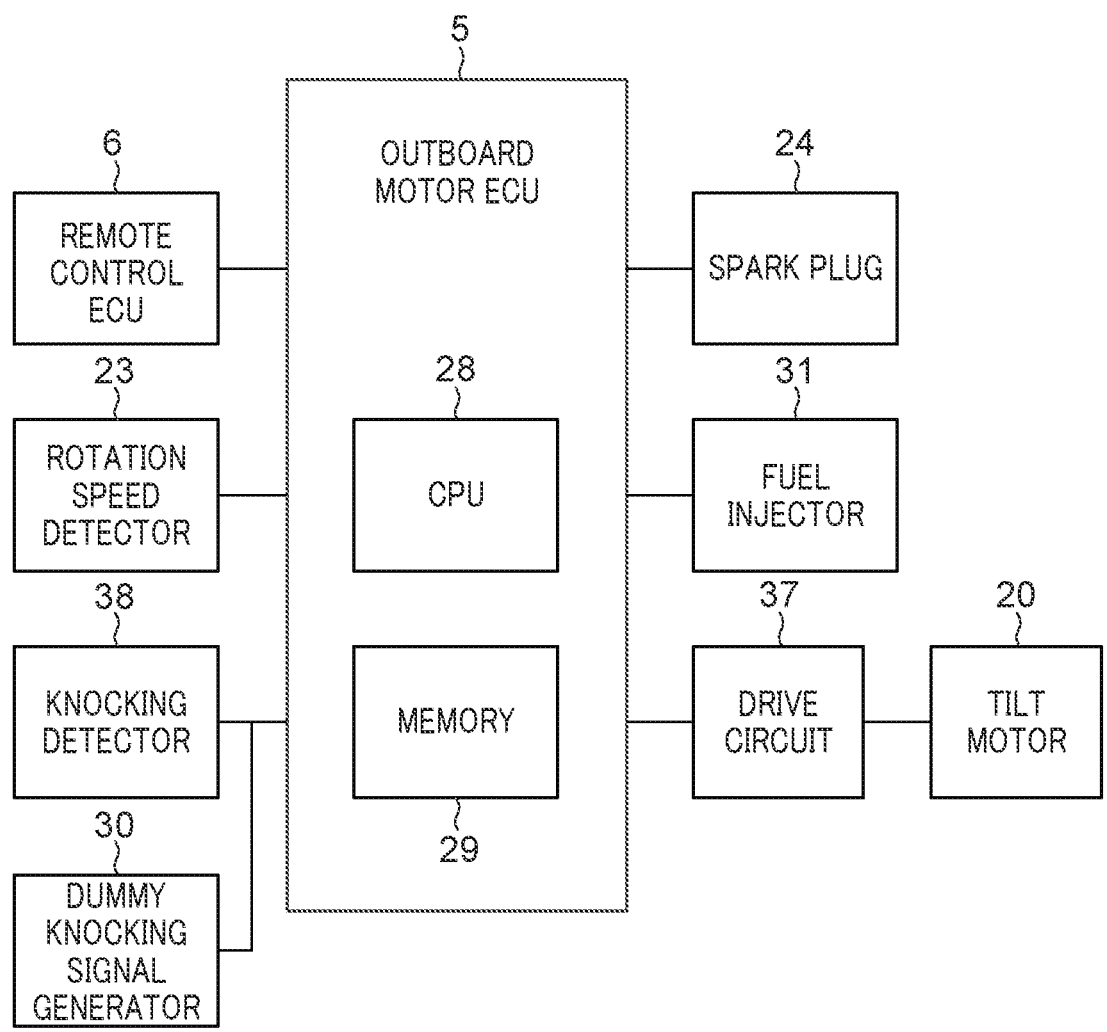
FIG. 6 is a diagram illustrating an electrical configuration of the outboard motor in FIG. 1.

FIG. 6 is a diagram illustrating an electrical configuration of the outboard motor 3. The outboard motor ECU 5 included in the outboard motor 3 has a CPU 28 and a memory 29 and receives various types of information regarding the operating state of the engine 4 from the corresponding remote control ECU 6 (for example, information regarding the target engine rotation speed and the operation signal of the tilt motor 20). Furthermore, the outboard motor ECU 5 receives information of the engine rotation speed from the rotation speed detector 23 as well as receiving a knocking signal indicating occurrence of knocking in the engine 4, from a knocking detector 38. The outboard motor ECU 5 determines the ignition timing, a fuel injection amount, and an intake amount based on these pieces of information and controls the spark plug 24, the fuel injector 31, and the throttle valve. Furthermore, in response to the operation signal of the tilt motor 20 received from the corresponding remote control ECU 6, the outboard motor ECU 5 controls the operation of the tilt motor 20 via a drive circuit 37.

The dummy knocking signal generator 30 is connected between the knocking detector 38 and the outboard motor ECU 5. The outboard motor ECU 5 that has received the dummy knocking signal transmitted by the dummy knocking signal generator 30 forcibly retards the ignition timing of the spark plug 24.

Meanwhile, when using a plurality of outboard motors in a marine vessel, it is common to use outboard motors of the same specifications. The marine vessel 1 in the present embodiment also uses two outboard motors 3 having the same specifications. Accordingly, each of the outboard motors 3 is equipped with the engine 4 of the same specifications. Therefore, when the engine rotation speeds of the engines 4 are the same, for example, the amplitude and cycle of the noise emitted from each of the outboard motors 3 are substantially the same. In the present embodiment, the fact that the amplitudes and cycles of the noise emitted from the respective outboard motors 3 are substantially the same is utilized, and the noise emitted from the individual outboard motors 3 is canceled to reduce the overall noise of the outboard motors 3.

Figure 7:
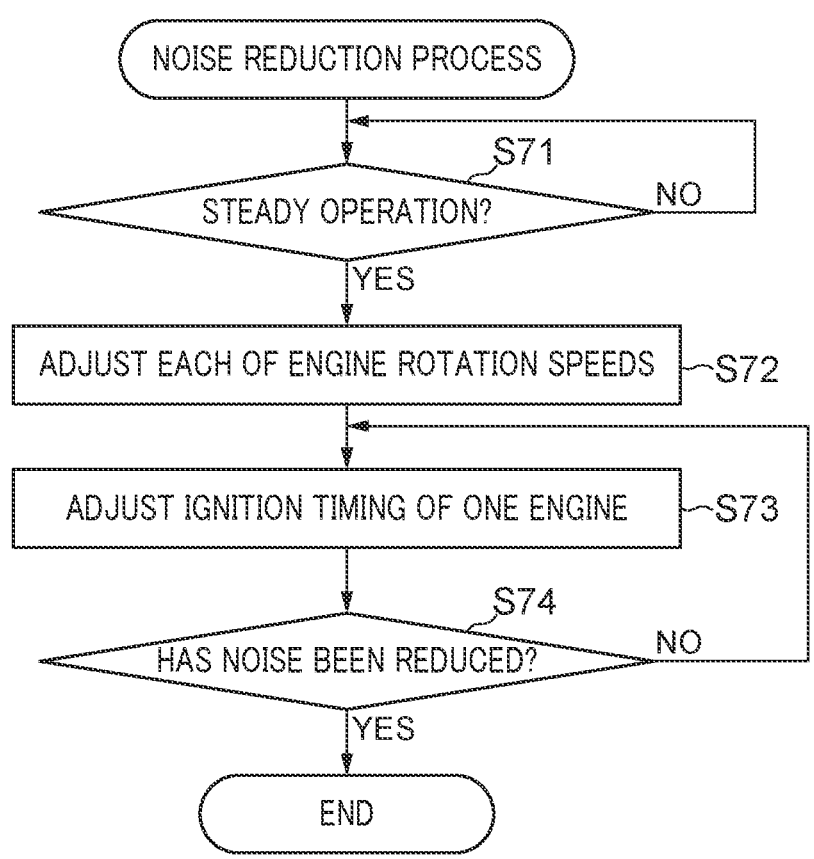
FIG. 7 is a flowchart illustrating a noise reduction process executed by the noise reduction system for the outboard motors according to the first embodiment.

FIG. 7 is a flowchart illustrating a noise reduction process executed by the noise reduction system for the outboard motor 3 according to the first embodiment. The process of FIG. 7 is implemented by execution of a control program read from the memory 29 by the CPU 28 of the outboard motor ECU 5 corresponding to one outboard motor 3. The process of FIG. 7 may be implemented by execution of the control program by the remote control ECU 6 corresponding to one outboard motor 3 based on various types of information transmitted from the outboard motor ECU 5. Furthermore, the process of FIG. 7 may be implemented by execution of the control program by the outboard motor ECU 5 and the remote control ECU 6 working in cooperation with each other. Furthermore, the process of FIG. 7 may be implemented by the execution of the control program by the dummy knocking signal generator 30 based on various types of information transmitted from the outboard motor ECU 5 and the remote control ECU 6. That is, the dummy knocking signal generator 30 may function like an additional ECU. In this case, it is possible to eliminate the need to change the specifications of the remote control ECU 6 and the outboard motor ECU 5 when executing the process of FIG. 7.

In FIG. 7, the outboard motor ECU 5 first determines whether the marine vessel 1 has transitioned to a steady operation state of traveling at a constant speed (step S71). This determination is made, for example, based on whether the marine vessel 1 is traveling at a constant speed, specifically, whether an amount of change in the vessel speed within a predetermined period of time is within a predetermined range. Note that in the process of FIG. 7, step S71 is not essential. For example, the vessel operator may operate a predetermined switch to allow the outboard motor ECU 5 corresponding to the one outboard motor 3 to execute the process of step S72 and subsequent processes when it is determined that the marine vessel 1 has transitioned to the steady operation state.

When the marine vessel 1 is traveling at a constant speed, the outboard motor ECU 5 determines that the marine vessel 1 has transitioned to the steady operation state (YES in step S71) and adjusts the rotation speed of the engine 4 of each of the outboard motors 3 to the same rotation speed (step S72). Specifically, the outboard motor ECU 5 controls the fuel injector 31 and/or the throttle valve to adjust the rotation speed of the engine 4. At this time, the rotation speed of each engine 4 is adjusted to the lower rotation speed out of rotation speeds of engines 4 of the two outboard motors 3. The rotation speed of each of the engines 4 may be adjusted to the higher rotation speed. When the marine vessel 1 is not traveling at a constant speed, the outboard motor ECU 5 determines that the marine vessel 1 has not transitioned to the steady operation state (NO in step S71), and returns to step S71.

Next, the dummy knocking signal generator 30 transmits a dummy knocking signal to the outboard motor ECU 5 corresponding to the one outboard motor 3. After receiving the dummy knocking signal, the outboard motor ECU 5 forcibly retards the ignition timing of the spark plug 24 (step S73). Accordingly, the ignition timing of the engine 4 of the one outboard motor 3 (hereinafter, abbreviated as "one engine 4") is changed to change a rotation phase of the crankshaft 21, leading to a change in a phase of the noise emitted from the one outboard motor 3.

Figure 8A:
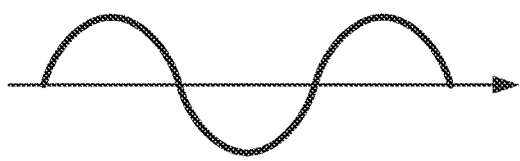
FIGS. 8A to 8C are diagrams illustrating a phenomenon when an ignition timing of one engine is changed.
Figure 8A:
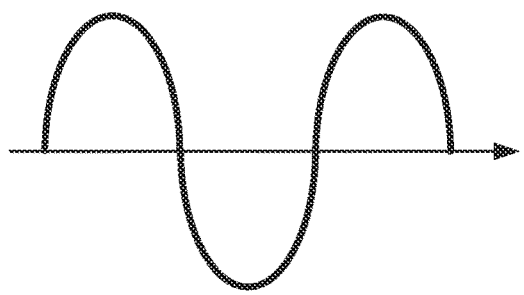
Figure 8A:
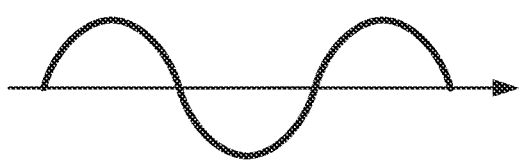
Figure 8B:
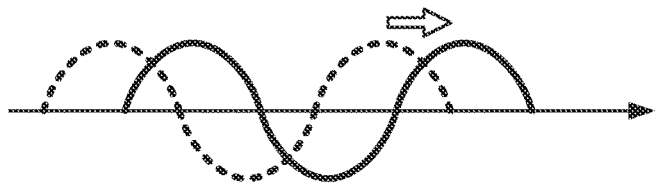
Figure 8C:
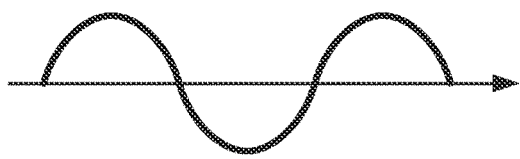
Figure 8C:
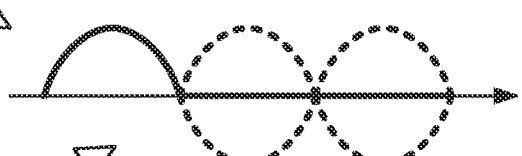
Figure 8C:
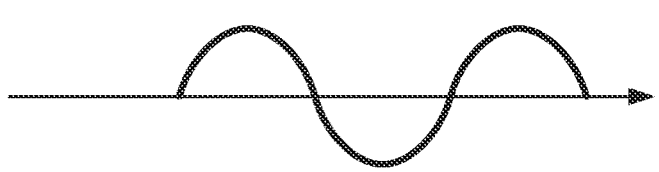

FIG. 8A to 8C are diagrams illustrating a phenomenon when the ignition timing of one engine 4 is changed.

In a case where the rotation speeds of the engines 4 of the respective outboard motors 3 are the same, an amplitude of a combined noise including the noise emitted from the two outboard motors 3 superimposed on each other might be about twice the noise emitted from each of the outboard motors 3 (FIG. 8A). Accordingly, there is room for improvement from the viewpoint of providing a comfortable boarding environment for the vessel operator and passengers of the marine vessel 1.

In contrast, gradually retarding the ignition timing of the spark plug 24 will gradually change the phase of the noise emitted from one outboard motor 3 (FIG. 8B), and the noise emitted from the other outboard motor 3 (first noise) will be gradually canceled by the noise (second noise) emitted from the one outboard motor 3. Eventually when the phase of the noise emitted from the one outboard motor 3 becomes an opposite phase with respect to the phase of the noise emitted from the other outboard motor 3, the noise emitted from the other outboard motor 3 will be substantially completely canceled by the noise emitted from the one outboard motor 3 (refer to "Combined noise of outboard motors 3" in FIG. 8C). That is, in step S73, by forcibly retarding the ignition timing of the spark plug 24 of the one engine 4, it is possible to reduce the overall noise generated by the two outboard motors 3.

Thereafter, the outboard motor ECU 5 determines whether the overall noise generated by the two outboard motors 3 has been reduced (step S74). Specifically, when a rotation cycle of the crankshaft 21 of the one engine 4 has shifted from a rotation cycle of the crankshaft 21 of the engine 4 of the other outboard motor 3 by about a half cycle, the phase of the noise emitted from the one outboard motor 3 becomes opposite to the phase of the noise emitted from the other outboard motor 3, and accordingly, the outboard motor ECU 5 determines that the overall noise has been reduced in this case. Whether the rotation cycle of the crankshaft 21 of the one engine 4 has shifted from the rotation cycle of the crankshaft 21 of the engine 4 of the other outboard motor 3 by about a half cycle is determined based on engine rotation speed information transmitted by the rotation speed detector 23. Note that it is also allowable to provide a microphone (not illustrated) on the hull 2 and determine that the overall noise has been reduced when the volume of the overall noise emitted from the two outboard motors 3 has decreased to a predetermined value or less.

FIG. 8A to 8C illustrate the case of reducing a primary component of the noise emitted from the outboard motor 3. However, there might be a case where a secondary component or a tertiary component of the noise will be unpleasant for the vessel operator. In this case, it is also possible to reduce the overall noise by forcibly retarding the ignition timing of the spark plug 24 of the one engine 4 to shift the phase of the noise emitted from the one outboard motor 3 and the phase of the noise emitted from the other outboard motor 3 from each other. However, when the overall noise is reduced, the rotation cycle of the crankshaft 21 of the engine 4 of the one outboard motor 3 has not always shifted from the rotation cycle of the crankshaft 21 of the engine 4 of the other outboard motor 3 by about a half cycle. Therefore, when reducing the secondary and tertiary components of the overall noise, it is preferable to determine whether the volume of the overall noise has decreased to a predetermined value or less by a microphone.

When it is not determined in step S74 that the overall noise has been reduced, the process returns to step S73 to continue retarding the ignition timing of the one engine 4. When it is determined that the overall noise has been reduced, the process ends.

According to the process of FIG. 7, the ignition timing of the one engine 4 is changed so as to change the phase of the noise emitted from the one outboard motor 3, and the noise will cancel the noise emitted from the other outboard motor 3, making it possible to conveniently reduce the overall noise of the plurality of outboard motors without adding a device such as a speaker. Furthermore, according to the process of FIG. 7, in step S72, the rotation speed of each engine 4 is adjusted to the lower rotation speed out of the rotation speeds of engines 4 of the two outboard motors 3, making it possible to suppress an increase in the overall noise as a result of adjusting the rotation speed of each of the engines 4 without unnecessarily increasing the rotation speed.

Furthermore, when changing the ignition timing of the one engine 4, it would be possible to allow the outboard motor ECU 5 to autonomously retard the ignition timing of the one engine 4. However, in this case, there is a need to install a special program to the outboard motor ECU 5 or customize the outboard motor ECU 5 to a special specification. In contrast, the outboard motor ECU 5 normally has a function of retarding the ignition timing of the engine 4 when the knocking signal is received (hereinafter, referred to as "retard function"). In the present embodiment, the dummy knocking signal generator 30 has been added, and the dummy knocking signal generator 30 transmits a dummy knocking signal, thereby forcibly retarding the ignition timing of the spark plug 24 using the retard function of the outboard motor ECU 5. That is, it is possible to reduce the overall noise of the plurality of outboard motors by simply adding the dummy knocking signal generator 30 without customizing the outboard motor ECU 5 to a special specification, which is advantageous in terms of cost and labor.

Although in the process of FIG. 7, the ignition timing of the one engine 4 is retarded, it is also allowable to gradually advance the ignition timing of the one engine 4. In this case, it is also expected to have a result that the phase of the noise emitted from one outboard motors 3 shifts from the phase of the noise emitted from the other outboard motor 3 to eventually become opposite phase, making it possible to obtain the effect similar to the case of retarding the ignition timing of the one engine 4.

Furthermore, while the present embodiment refers to the case where the marine vessel 1 includes two outboard motors 3, the present invention is also applicable to a case where the marine vessel 1 includes three or more outboard motors 3. For example, in a case where the marine vessel 1 includes N outboard motors 3, the ignition timing of each of the engines 4 is shifted from each other, leading to the shift of the rotation cycle of the crankshaft 21 of each of the engines 4 by 1/N cycle, making it possible to reduce the overall noise of the N outboard motors.

Next, a second embodiment of the present invention will be described. The second embodiment is basically the same in its configuration and operation as the above-described first embodiment. Accordingly, the duplicated configuration and operation will not be described, and configurations and operations having differences will be described below. The second embodiment is different from the first embodiment in that the outboard motor 3 includes a propulsion motor 32 being an electric motor as a power source (propulsion source) instead of the engine 4 being an internal combustion engine.

Figure 9:
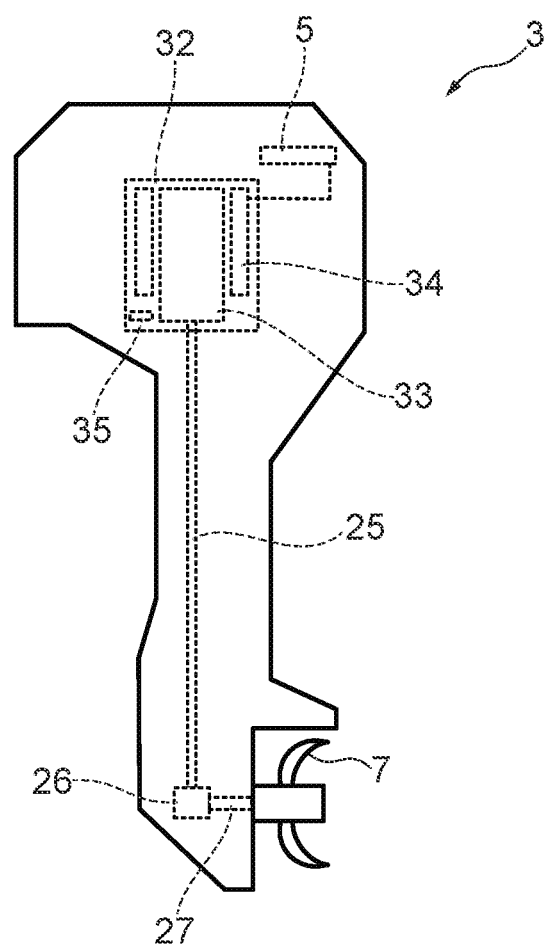
FIG. 9 is a schematic perspective side view of a configuration of an outboard motor in a second embodiment.

FIG. 9 is a schematic perspective side view of a configuration of the outboard motor 3 in the second embodiment. The outboard motor 3 has the propulsion motor 32 that rotationally drives the propeller 7, and the outboard motor ECU 5 mainly controls the propulsion motor 32.

The propulsion motor 32 is a brushed motor and includes: a rotor 33 (rotary member) around which a coil (not illustrated) is wound; a magnet 34 disposed opposite to the rotor 33 and having alternately arranged N poles and S poles; and a rotation speed detector 35. The propulsion motor 32 is disposed so that the rotor 33 extends vertically in the figure. The rotor 33 is rotationally driven around a vertical axis in the figure together with a change in the magnetic field generated by the coil. The rotation speed detector 35 detects a rotation speed of the rotor 33 (rotation speed of the propulsion motor 32) and outputs a detection signal in synchronization with rotation of the rotor 33. The outboard motor ECU 5 calculates a rotation phase of the propulsion motor 32 based on the detection signal. The form of the propulsion motor 32 is not limited to the brushed motor illustrated in FIG. 9, and it is allowable to use a brushless motor or another form of motor.

The propulsion motor 32 is connected to a drive circuit 36. The drive circuit 36 changes a magnitude of the voltage and a phase of current supplied to the propulsion motor 32 to adjust the rotation speed and the rotation phase of the rotor 33. The propulsion motor 32 and the propeller 7 are connected by the drive shaft 25, the gear box 26 and the propeller shaft 27 so as to transmit the rotation of the rotor 33 to the propeller 7.

Figure 10:
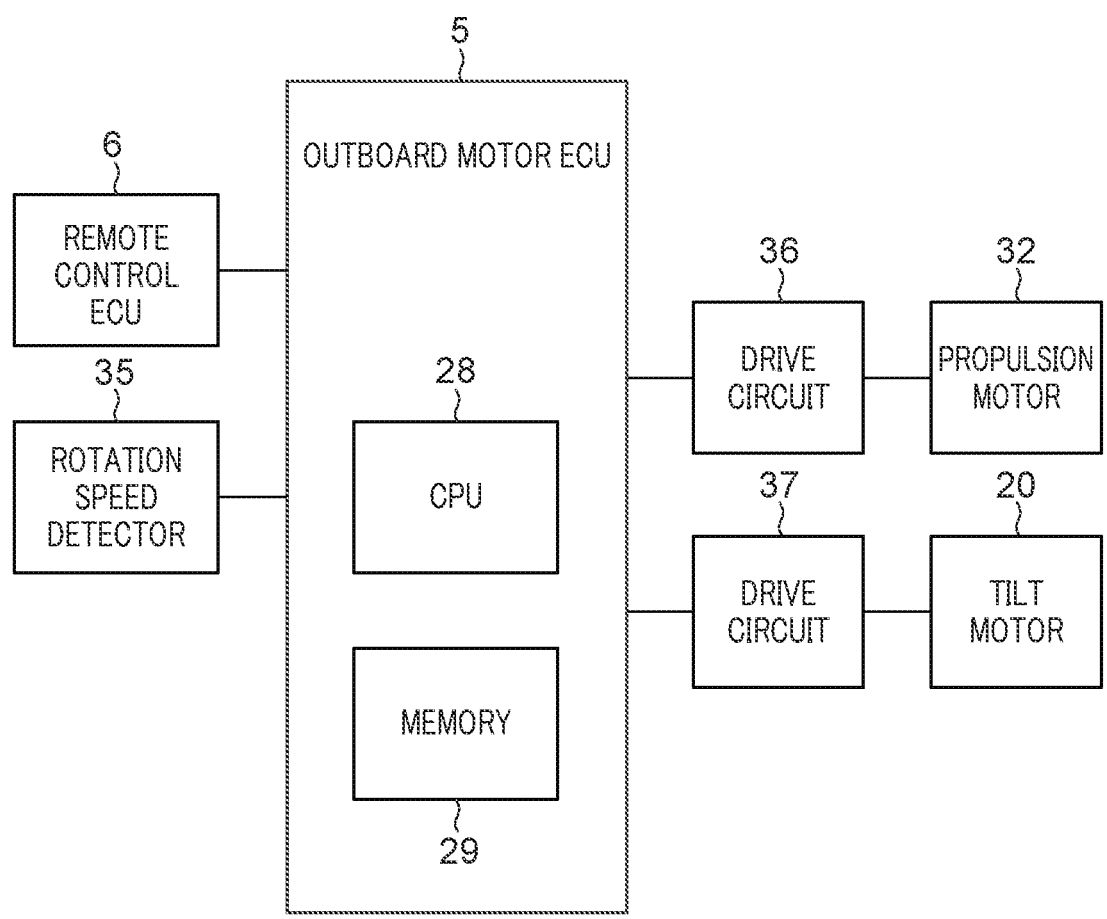
FIG. 10 is a diagram illustrating an electrical configuration of the outboard motor in FIG. 9.

FIG. 10 is a diagram illustrating an electrical configuration of the outboard motor 3 in FIG. 9. The outboard motor ECU 5 included in the outboard motor 3 receives various types of information regarding an operation state of the propulsion motor 32 from a corresponding remote control ECU 6 (for example, information regarding the target propulsion motor rotation speed). Furthermore, the outboard motor ECU 5 receives information of the rotation speed of the propulsion motor 32 from the rotation speed detector 35 and calculates the rotation phase of the propulsion motor 32. The outboard motor ECU 5 determines the magnitude of the voltage and the phase of the current supplied to the propulsion motor 32 based on these pieces of information and controls the rotation speed and the rotation phase of the rotor 33 via the drive circuit 36.

Figure 11:
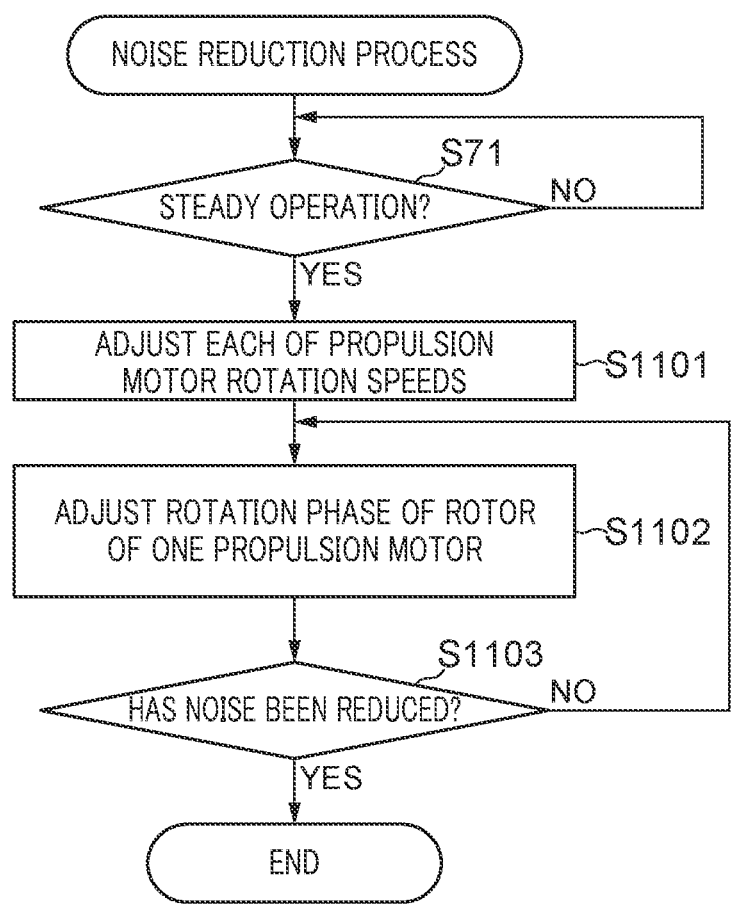
FIG. 11 is a flowchart illustrating a noise reduction process executed by a noise reduction system for outboard motors according to the second embodiment.

FIG. 11 is a flowchart illustrating a noise reduction process executed by the noise reduction system of the outboard motor 3 according to the second embodiment. Similar to the process of FIG. 7, the process of FIG. 11 is implemented by execution of the control program read from the memory 29 by the CPU 28 of the outboard motor ECU 5 corresponding to the one outboard motor 3. The process of FIG. 11 may also be implemented by execution of the control program by the remote control ECU 6 corresponding to one outboard motor 3 based on various types of information transmitted from the outboard motor ECU 5. Furthermore, the process of FIG. 11 may be implemented by execution of the control program by the outboard motor ECU 5 and the remote control ECU 6 in cooperation with each other. Note that, in the following description, the description of the process of the same steps as those in the process of FIG. 7 will be omitted.

In FIG. 11, in a case where it is determined in step S71 that the marine vessel 1 has transitioned to the steady operation state, the outboard motor ECU 5 adjusts the rotation speed of the propulsion motor 32 of each of the outboard motors 3 to the same rotation speed (step S1101). Specifically, the outboard motor ECU 5 adjusts the magnitude of the voltage to supply to the propulsion motors 32 to adjust the rotation speed of the propulsion motors 32. At this time, the rotation speed of each propulsion motors 32 are adjusted to the lower rotation speed out of the rotation speeds of the propulsion motors 32 of the two outboard motors 3. The rotation speed of each of the propulsion motors 32 may be adjusted to the higher rotation speed.

Next, the outboard motor ECU 5 adjusts the magnitude of the voltage and the phase of the current to supply so as to gradually change the rotation phase of the rotor 33 of the propulsion motor 32 of the one outboard motor 3 (hereinafter abbreviated as "one propulsion motor 32") (step S1102). This operation changes the phase of the noise emitted from the one outboard motor 3. At this time, as described with reference to FIGS. 8A to 8C, the phase of the noise emitted from one outboard motor 3 gradually changes. When the phase of the noise emitted from the one outboard motor 3 eventually becomes opposite to the phase of the noise emitted from the other outboard motor 3, the noise emitted from the other outboard motor 3 is substantially completely canceled by the noise emitted from the one outboard motor 3.

Thereafter, the outboard motor ECU 5 determines whether the overall noise emitted from the two outboard motors 3 has been reduced (step S1103). Specifically, when the rotation cycle of the rotor 33 of the one propulsion motor 32 has shifted from the rotation cycle of the rotor 33 of the propulsion motor 32 of the other outboard motor 3 by about a half cycle, the phase of the noise emitted from the one outboard motor 3 becomes opposite to the phase of the noise emitted from the other outboard motor 3, and accordingly, the outboard motor ECU 5 determines that the overall noise has been reduced in this case. Whether the rotation cycle of the rotor 33 of the one propulsion motor 32 has shifted from the rotation cycle of the rotor 33 of the propulsion motor 32 of the other outboard motor 3 by about a half cycle is determined based on the information of the rotation speed of the propulsion motor 32 transmitted by the rotation speed detector 35. Note that when entirely reducing the secondary and tertiary components of the noise, it is preferable to determine whether the overall volume has decreased to a predetermined value or less by a microphone.

When it is not determined in step S1103 that the overall noise has been reduced, the process returns to step S1102 to continue changing the rotation phase of the rotor 33 of the one propulsion motor 32. When it is determined that the overall noise has been reduced, the process ends.

According to the process of FIG. 11, the rotation phase of the rotor 33 of the one propulsion motor 32 is changed so as to change the phase of the noise emitted from the one outboard motor 3, and the noise cancels the noise emitted from the other outboard motor 3. Accordingly, the effect similar to that of the first embodiment can be obtained.

Note that the present invention can be applied to the case where the marine vessel 1 includes three or more outboard motors 3 similarly to the case of the first embodiment. For example, in a case where the marine vessel 1 includes the N outboard motors 3, the rotation phases of the rotors 33 of the propulsion motors 32 are shifted from each other, leading to the shift of the rotation cycles of the rotors 33 of the propulsion motors 32 by 1/N cycle, making it possible to reduce the overall noise of the N outboard motors.

Next, a third embodiment of the present invention will be described. The third embodiment is basically the same in its configuration and operation as the above-described first embodiment. Accordingly, the duplicated configuration and operation will not be described, and configurations and operations having differences will be described below. The third embodiment is different from the first and second embodiments in that the noise of each of the outboard motors 3 caused by the tilt motor 20 is reduced, rather than by the engine 4 or the propulsion motor 32.

As described above, each of the outboard motors 3 includes the PTT mechanism 18. For example, after landing or mooring the marine vessel 1 to the landing pier, the PTT mechanism 18 is used to pivot the outboard motor 3 about the tilt axis so as to be transitioned to the tilt-up state (refer to FIG. 12). At this time, noise is generated in each of the outboard motors 3L and 3R due to the operation of the corresponding tilt motor 20, while the engine 4 and the propulsion motor 32 are stopped, as well as the marine vessel 1, causing occurrence of no wind noise or rippling noise. Therefore, the noise caused by the operation of the tilt motor 20 is received as an unexpectedly loud and uncomfortable noise for the vessel operator. To handle this, in the present embodiment, overall noise caused by the operation of the tilt motor 20 of each of the outboard motor 3L and 3R is reduced.

Figure 13:
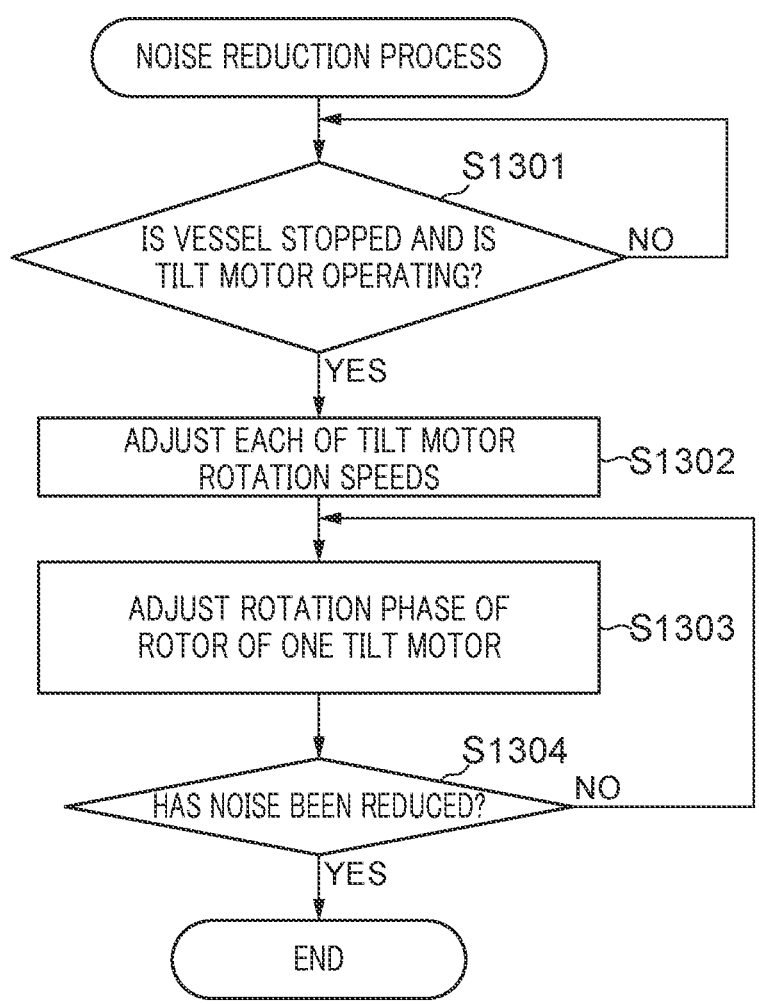
FIG. 13 is a flowchart illustrating a noise reduction process executed by a noise reduction system for outboard motors according to a third embodiment.

FIG. 13 is a flowchart illustrating a noise reduction process executed by the noise reduction system of the outboard motor 3 according to the third embodiment. Similar to the process of FIG. 7, the process of FIG. 13 is implemented by execution of the control program read from the memory 29 by the CPU 28 of the outboard motor ECU 5 corresponding to the one outboard motor 3. The process of FIG. 13 may also be implemented by execution of the control program by the remote control ECU 6 corresponding to the one outboard motor 3 based on various types of information transmitted from the outboard motor ECU 5. Furthermore, the process may be implemented by execution of the control program by the outboard motor ECU 5 and the remote control ECU 6 working in cooperation with each other.

In FIG. 13, the outboard motor ECU 5 first determines whether the marine vessel 1 is stopped and the tilt motors 20 of the outboard motors 3L and 3R are operating (step S1301).

When it is determined that the marine vessel 1 is stopped and the tilt motors 20 of the outboard motors 3L and 3R are operating (YES in step S1301), the rotation speeds of the tilt motors 20 of the outboard motors 3 are adjusted to the same rotation speed (step S1302). Specifically, the outboard motor ECU 5 adjusts the magnitude of the voltage to supply to the propulsion motors 32 to adjust the rotation speed of the tilt motors 20 via the drive circuit 37. At this time, the rotation speed of each tilt motor 20 are adjusted to the lower rotation speed out of rotation speeds of the tilt motors 20 of the two outboard motors 3. The rotation speed of each of the tilt motors 20 may be adjusted to the higher rotation speed. When it is determined that the marine vessel 1 is not stopped or the tilt motors 20 of the outboard motors 3L and 3R are not operating (NO in step S1301), the process returns to step S1301.

Next, the outboard motor ECU 5 adjusts the magnitude of the voltage and the phase of the current to supply so as to gradually change the rotation phase of the rotor (not illustrated) of the tilt motor 20 of the one outboard motor 3 (hereinafter abbreviated as "one tilt motor 20") via the drive circuit 37 (step S1303). This operation changes the phase of the noise emitted from the one outboard motor 3. At this time, as described with reference to FIGS. 8A to 8C, the phase of the noise emitted from the one outboard motor 3 gradually changes. When the phase of the noise emitted from the one outboard motor 3 eventually becomes opposite to the phase of the noise emitted from the other outboard motor 3, the noise emitted from the other outboard motor 3 is substantially completely canceled by the noise emitted from the one outboard motor 3.

Thereafter, the outboard motor ECU 5 determines whether the overall noise emitted from the two outboard motors 3 has been reduced (step S1304). Specifically, the outboard motor ECU 5 determines whether the rotation cycle of the rotor of the one tilt motor 20 has shifted from the rotation cycle of the rotor of the tilt motor 20 of the other outboard motor 3 by about a half cycle or determines whether the volume of noise collected by a microphone (not illustrated) provided on the hull 2 has decreased to a predetermined value or less.

When it is not determined in step S1304 that the overall noise has been reduced, the process returns to step S1303 to continue changing the rotation phase of the rotor of the one tilt motor 20. When it is determined that the overall noise has been reduced, the process ends.

According to the process of FIG. 13, the rotation phase of the rotor of the one tilt motor 20 is changed so as to change the phase of the noise emitted from the one outboard motor 3, and the noise cancels the noise emitted from the other outboard motor 3. Accordingly, the effect similar to that of the first embodiment can be obtained.

Note that the present invention can be applied to the case where the marine vessel 1 includes three or more outboard motors 3 similarly to the case of the first embodiment. For example, in a case where the marine vessel 1 includes the N outboard motors 3, the rotation phases of the rotors of the tilt motors 20 are shifted from each other, leading to the shift of the rotation cycles of the rotors of the tilt motors 20 by 1/N cycle, making it possible to reduce the overall noise of the N outboard motors. Furthermore, the third embodiment is also applicable to a case where the marine vessel 1 includes an inboard/outboard drive, instead of the outboard motor 3 and where the drive unit of the inboard motor/outboard drive is moved relative to the hull 2 by a hydraulic cylinder to which hydraulic oil is supplied from a hydraulic pump driven by a tilt motor.

While the preferred embodiments of the present invention have been described above, the present invention is not limited to the above-described embodiments, and various modifications and alterations can be made within the scope of the invention.

For example, while in the above-described embodiments, examples in which each of the outboard motors 3 uses the engine 4 or the propulsion motor 32 as a drive source are explained, the present invention is applicable as long as each of the outboard motors 3 uses a drive source that operates on a same principle. For example, even when each of the outboard motors 3 uses a hybrid drive source having the engine 4 and the propulsion motor 32, the present invention is applicable as long as the specifications of the hybrid drive sources are the same. Moreover, the present invention is also applicable to a case where the marine vessel includes a plurality of inboard/outboard motors (stern drives, or inboard motor/outboard drives) or a plurality of inboard motors as long as a drive source that operates on a same principle is used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A noise reduction system for a marine vessel having a plurality of outboard motors, which include a first outboard motor and a second outboard motor, mounted on a hull thereof, each of the plurality of outboard motors including a drive source, each of the drive sources including a rotary member, wherein
   the rotary member of the drive source of each of the first outboard motor and the second outboard motor is above water, and
   the rotary member of the drive source of each of the first outboard motor and the second outboard motor is either a crankshaft of an internal combustion engine, or a rotor of an electric motor,
the noise reduction system comprising:
   a controller configured to control rotation of the rotary member, which is above water, of the drive source in the second outboard motor, to thereby control a phase of a second noise caused thereby, such that a first noise caused by rotation of the rotary member, which also is above water, of the drive source in the first outboard motor is canceled by the second noise.

2. The noise reduction system according to claim 1, wherein
   the controller changes a rotation phase of the rotary member of the drive source in the second outboard motor to change the phase of the second noise.

3. The noise reduction system according to claim 1, wherein
   the controller changes the phase of the second noise when the hull is in a steady operation.

4. The noise reduction system according to claim 1, wherein
   the controller adjusts a rotation speed of the rotary member of each of the drive sources to a same speed before changing the phase of the second noise.

5. The noise reduction system according to claim 1, wherein
   each of the drive sources is the internal combustion engine.

6. A noise reduction system for a marine vessel having a plurality of outboard motors, which include a first outboard motor and a second outboard motor, mounted on a hull thereof, each of the plurality of outboard motors including a drive source, each of the drive sources including a rotary member, the noise reduction system comprising:
   a controller configured to control rotation of the rotary member of the drive source in the second outboard motor, to thereby control a phase of a second noise caused thereby, such that a first noise caused by rotation of the rotary member of the drive source in the first outboard motor is canceled by the second noise, wherein
   each of the drive sources is an internal combustion engine, and each of the rotary members is a crankshaft, and
   the controller shifts an ignition timing of the internal combustion engine in the second outboard motor to change the phase of the second noise.

7. The noise reduction system according to claim 6, wherein
   the controller retards the ignition timing of the internal combustion engine in the second outboard motor based on a dummy knocking signal.

8. The noise reduction system according to claim 5, wherein
   the controller determines whether the first noise is canceled by the second noise based on rotation cycles of the crankshafts of the internal combustion engines.

9. The noise reduction system according to claim 1, wherein
   each of the drive sources is the electric motor.

10. The noise reduction system according to claim 9, wherein
    the controller shifts a rotation phase of the rotor of the electric motor in the second outboard motor to change the phase of the second noise.

11. The noise reduction system according to claim 9, wherein
    each of the electric motors is used for propulsion of the hull.

12. The noise reduction system according to claim 9, wherein
    each of the electric motors is used for relative movement of a corresponding one of the plurality of outboard motors with respect to the hull.

13. A noise reduction system for a marine vessel having a plurality of marine propulsion devices including a first marine propulsion device and a second marine propulsion device, each of the plurality of marine propulsion devices including a drive source, each of the drive sources operating on a same principle as that of the other drive sources, and including a rotary member, wherein
    the rotary member of the drive source of each of the plurality of marine propulsion devices is above water, and
    the rotary member of the drive source of each of the plurality of marine propulsion devices is either a crankshaft of an internal combustion engine, or a rotor of an electric motor,
the noise reduction system comprising:
    a controller configured to control rotation of the rotary member, which is above water, of the drive source in the second marine propulsion device, to thereby control a phase of a second noise caused thereby, such that a first noise caused by rotation of the rotary member, which also is above water, of the drive source in the first marine propulsion device is canceled by the second noise.

14. The noise reduction system according to claim 13, wherein
the controller changes a rotation phase of the rotary member of the drive source in the second marine propulsion device to change the phase of the second noise.

15. The noise reduction system according to claim 1, wherein
the controller includes
a processor, and
a non-transitory storage medium having program instructions stored thereon, execution of which by the processor causes the controller to control the rotation of the rotary member of the drive source in the second outboard motor.

16. The noise reduction system according to claim 13, wherein
the controller includes
a processor, and
a non-transitory storage medium having program instructions stored thereon, execution of which by the processor causes the controller to control the rotation of the rotary member of the drive source in the second marine propulsion device.

* * * * *